US011331616B2

(12) United States Patent
Henderson et al.

(10) Patent No.: US 11,331,616 B2
(45) Date of Patent: May 17, 2022

(54) POOL FILTER ASSEMBLY

(71) Applicants: Mark Henderson, Milford, DE (US); Antonio M. Pacheco, Egg Harbor City, NJ (US)

(72) Inventors: Mark Henderson, Milford, DE (US); Antonio M. Pacheco, Egg Harbor City, NJ (US)

( * ) Notice: Subject to any disclaimer, the term of this patent is extended or adjusted under 35 U.S.C. 154(b) by 0 days.

(21) Appl. No.: 17/032,760

(22) Filed: Sep. 25, 2020

(65) Prior Publication Data
US 2022/0096988 A1 Mar. 31, 2022

(51) Int. Cl.
*B01D 46/62* (2022.01)
*C02F 1/00* (2006.01)
*B01D 46/52* (2006.01)
*B01D 24/14* (2006.01)
*C02F 103/42* (2006.01)

(52) U.S. Cl.
CPC .......... *B01D 46/62* (2022.01); *B01D 24/14* (2013.01); *B01D 46/521* (2013.01); *C02F 1/001* (2013.01); *C02F 2103/42* (2013.01)

(58) Field of Classification Search
None
See application file for complete search history.

(56) References Cited

U.S. PATENT DOCUMENTS

| 171,439 | A | * | 12/1875 | Sinclaire | B01D 24/14 210/289 |
| 260,106 | A | * | 6/1882 | Long | C02F 1/003 210/266 |
| 327,646 | A | * | 10/1885 | Bingham | B01D 24/008 210/283 |
| 388,017 | A | * | 8/1888 | Brownlow | C02F 1/003 210/266 |
| 426,945 | A | * | 4/1890 | Maignen | B01D 29/111 210/493.1 |
| 529,471 | A | * | 11/1894 | Arendell | C02F 1/003 210/266 |
| 582,400 | A | * | 5/1897 | Stifel | B01D 35/14 210/92 |
| 585,497 | A | * | 6/1897 | Aufrichtig | B01D 17/0214 210/128 |
| 597,248 | A | * | 1/1898 | Rhood | B01D 29/48 210/397 |

(Continued)

*Primary Examiner* — Robert J Popovics
(74) *Attorney, Agent, or Firm* — Fox Rothschild LLP

(57) ABSTRACT

A pool filter system includes a filter housing with an open interior. A pleated filter container in the open interior of the filter housing has a pleated filter side wall and divides the interior of the filter housing into an pleated filter compartment and an particulate filter compartment surrounding the pleated filter side wall. The pleated filter side wall has a plurality of pleated filter container openings. A particulate filter medium is within the particulate filter compartment, and a pleated filter is within the open interior of the pleated filter compartment. A water inlet communicates with the particulate filter compartment, and a water outlet communicates with the pleated filter compartment. The pleated filter container openings in the pleated filter container side wall have a dimension that is less than the diameter of the particulate filter medium. A backwash assembly and a method of filtering pool water is also disclosed.

15 Claims, 10 Drawing Sheets

(56) References Cited

U.S. PATENT DOCUMENTS

| | | | | |
|---|---|---|---|---|
| 600,939 A * | 3/1898 | Wilder | B01D 24/205 | 210/291 |
| 620,451 A * | 2/1899 | Hellwig | C02F 1/003 | 210/266 |
| 1,757,554 A * | 5/1930 | Auberschek | B01D 24/12 | 210/278 |
| 1,993,142 A * | 3/1935 | Johnson | C02F 1/42 | 210/283 |
| 2,027,400 A * | 1/1936 | Pennebaker | B01D 27/08 | 210/266 |
| 2,243,559 A * | 5/1941 | Griffith | B01D 29/48 | 210/327 |
| 2,496,370 A * | 2/1950 | Baily | B01D 29/965 | 210/399 |
| 2,562,699 A * | 7/1951 | Cooperson | B01D 29/33 | 210/797 |
| 2,600,458 A * | 6/1952 | Ackley | B01D 35/153 | 210/135 |
| 2,668,622 A * | 2/1954 | Irvine | C10M 175/00 | 210/186 |
| 2,785,805 A * | 3/1957 | Hough | B01D 29/21 | 210/295 |
| 2,960,232 A * | 11/1960 | Gillette | B01D 27/06 | 210/167.13 |
| 2,979,733 A * | 4/1961 | Saint Clair | E04H 4/1681 | 210/167.12 |
| 3,054,507 A * | 9/1962 | Humbert, Jr. | B01D 27/06 | 210/493.1 |
| 3,178,025 A * | 4/1965 | Brucken | D06F 43/085 | 210/266 |
| 3,189,179 A * | 6/1965 | Mcmichael | B01D 29/58 | 210/238 |
| 3,212,641 A * | 10/1965 | Schwartzwalder | B01D 29/54 | 210/266 |
| 3,365,064 A * | 1/1968 | Horan, Jr. | B01D 37/02 | 210/167.13 |
| 3,552,553 A * | 1/1971 | Reading | B01D 29/58 | 210/484 |
| 3,581,895 A * | 6/1971 | Howard | B01D 24/14 | 210/108 |
| 3,642,141 A * | 2/1972 | Hobson, Jr. | B01D 29/52 | 210/323.2 |
| 3,662,780 A * | 5/1972 | Marsh | B01J 47/022 | 137/590 |
| 3,669,882 A * | 6/1972 | Hirs | B01D 24/047 | 210/792 |
| 3,707,233 A * | 12/1972 | Lerner | B01D 24/40 | 210/278 |
| 3,737,039 A * | 6/1973 | Hirs | B01D 24/4636 | 210/792 |
| 3,747,768 A * | 7/1973 | Barrera | B01D 24/14 | 210/288 |
| 3,767,050 A * | 10/1973 | Reiner | B01D 36/02 | 210/167.13 |
| 3,847,805 A * | 11/1974 | Voedisch | B01J 8/025 | 210/675 |
| 3,859,214 A * | 1/1975 | Lang | B01D 29/54 | 210/167.14 |
| 4,043,917 A * | 8/1977 | Rowley | B01D 29/54 | 210/323.2 |
| 4,134,836 A * | 1/1979 | Rowley | B01D 35/027 | 210/232 |
| 4,161,963 A * | 7/1979 | Stevens | B01D 24/14 | 137/592 |
| 4,187,179 A * | 2/1980 | Harms | B01D 29/54 | 210/238 |
| 4,200,536 A * | 4/1980 | Kaufman | B01D 24/4631 | 210/279 |
| 4,301,009 A * | 11/1981 | Cook | C02F 1/003 | 210/278 |
| 4,384,962 A * | 5/1983 | Harris | C10G 33/06 | 210/788 |
| 4,441,998 A * | 4/1984 | Ueda | B01D 24/12 | 210/275 |
| 4,452,705 A * | 6/1984 | Herrmann | B01J 47/022 | 210/286 |
| 4,574,048 A * | 3/1986 | van den Broek | B01D 36/001 | 210/136 |
| 4,622,137 A * | 11/1986 | Kessler | B01D 29/668 | 210/167.13 |
| 4,657,673 A * | 4/1987 | Kessler | B01D 29/54 | 210/108 |
| 4,704,202 A * | 11/1987 | Poyner | B01D 29/54 | 210/108 |
| 4,773,998 A * | 9/1988 | Heinrich | B01D 24/12 | 210/279 |
| 4,909,937 A * | 3/1990 | Hoffmann | B01D 29/54 | 210/315 |
| 4,944,887 A * | 7/1990 | Frederick | B01D 29/395 | 210/778 |
| 5,008,008 A * | 4/1991 | Lockshaw | B01D 24/12 | 210/167.12 |
| 5,171,442 A * | 12/1992 | Nakshbendi | C02F 9/005 | 210/256 |
| 5,203,998 A * | 4/1993 | Benian | B01D 29/21 | 210/493.5 |
| 5,397,465 A * | 3/1995 | Stewart | B01D 29/6453 | 210/167.13 |
| 5,505,844 A * | 4/1996 | Porter | B01D 24/10 | 210/95 |
| 5,591,329 A * | 1/1997 | Davidson | B01D 29/21 | 210/193 |
| 5,628,896 A * | 5/1997 | Klingenberger | B01D 24/00 | 210/86 |
| 5,762,785 A * | 6/1998 | Garrigos Ruiz | B01D 35/14 | 210/167.13 |
| 5,804,080 A * | 9/1998 | Klingenberger | B01D 24/00 | 210/739 |
| 5,871,641 A * | 2/1999 | Davidson | B01D 29/665 | 210/193 |
| 5,882,528 A * | 3/1999 | Davidson | B01D 29/21 | 210/777 |
| 5,980,759 A * | 11/1999 | Proulx | B01D 29/21 | 210/767 |
| 6,004,458 A * | 12/1999 | Davidson | C02F 1/003 | 210/206 |
| 6,022,481 A * | 2/2000 | Blake | E04H 4/1272 | 15/1.7 |
| 6,200,471 B1 * | 3/2001 | Nohren, Jr. | C02F 1/003 | 210/184 |
| 6,217,754 B1 * | 4/2001 | Ros | C02F 1/004 | 210/167.11 |
| 6,365,044 B1 * | 4/2002 | Crane | B01D 35/30 | 210/248 |
| 6,379,560 B1 * | 4/2002 | Tilp | B01D 35/303 | 210/195.1 |
| 6,649,048 B2 * | 11/2003 | de Ridder | B01D 24/08 | 210/106 |
| 6,755,967 B2 * | 6/2004 | Voll | B01D 19/0005 | 210/170.07 |
| 6,986,842 B2 * | 1/2006 | Bortnik | B01D 39/12 | 210/232 |
| 7,018,547 B1 * | 3/2006 | Silva | B01D 29/014 | 210/167.13 |
| 7,087,166 B1 * | 8/2006 | Sudo | B01D 29/15 | 210/232 |
| 7,214,311 B2 * | 5/2007 | Aberle | E03F 5/0404 | 210/170.03 |
| 7,335,299 B2 * | 2/2008 | King | A01N 59/16 | 210/167.31 |
| 7,341,662 B2 * | 3/2008 | Tolley | B01D 24/407 | 210/275 |
| 7,419,591 B2 * | 9/2008 | Aberle | E03F 5/0404 | 210/170.03 |
| 7,468,134 B2 * | 12/2008 | Hoang | A01K 63/045 | 210/150 |
| 7,513,993 B2 * | 4/2009 | Goodwin | B01D 24/14 | 210/167.13 |

(56) References Cited

U.S. PATENT DOCUMENTS

| | | | |
|---|---|---|---|
| 7,708,882 B2 * | 5/2010 | Kobayashi | B01D 63/043 210/232 |
| 7,794,591 B2 * | 9/2010 | Nibler | C02F 1/004 210/167.12 |
| 7,799,235 B2 * | 9/2010 | Olson | B01D 29/15 210/767 |
| 7,815,796 B2 * | 10/2010 | Nibler | B01D 35/30 210/167.12 |
| 7,951,293 B2 * | 5/2011 | Nibler | E04H 4/1209 210/167.11 |
| 8,069,989 B1 * | 12/2011 | Gordon | B01D 29/72 210/408 |
| 8,137,545 B2 * | 3/2012 | Nibler | C02F 1/004 210/167.12 |
| 8,173,011 B2 * | 5/2012 | Nibler | F28D 1/053 210/167.11 |
| 8,225,940 B2 * | 7/2012 | Schmidt | B01D 29/21 210/493.5 |
| 8,795,521 B1 * | 8/2014 | McBride | B01D 24/12 210/189 |
| 8,936,721 B2 * | 1/2015 | Renaud | C02F 1/004 210/167.13 |
| 8,992,775 B2 * | 3/2015 | Swindell | B01D 29/62 210/333.01 |
| 9,108,126 B2 * | 8/2015 | Renaud | B29C 49/4815 |
| 9,409,115 B2 * | 8/2016 | Hampton | B01D 29/232 |
| 9,469,550 B2 * | 10/2016 | Closi, Jr | C02F 1/002 |
| 9,539,529 B2 * | 1/2017 | Mullis | B01D 35/02 |
| 9,656,191 B2 * | 5/2017 | Hull | A47G 19/2266 |
| 9,816,282 B2 * | 11/2017 | Chick | E04H 4/1245 |
| 9,844,743 B2 * | 12/2017 | Saito | B01D 25/24 |
| 10,145,275 B2 * | 12/2018 | Saito | B01D 27/00 |
| 10,219,975 B2 * | 3/2019 | Potucek | B25J 9/1694 |
| 10,369,498 B2 * | 8/2019 | Morishita | B01D 24/02 |
| 10,427,076 B2 * | 10/2019 | Swindell | B01D 29/96 |
| 10,463,997 B2 * | 11/2019 | Hampton | B01D 46/2411 |
| 10,625,188 B2 * | 4/2020 | Erlich | B01D 29/15 |
| 10,792,596 B1 * | 10/2020 | Mjelde | B01D 35/30 |
| 10,898,836 B2 * | 1/2021 | Hampton | B01D 29/54 |
| 11,014,027 B1 * | 5/2021 | Mjelde | B01D 35/30 |
| 2001/0010297 A1 * | 8/2001 | Pulek | B01D 29/21 210/493.2 |
| 2002/0008068 A1 * | 1/2002 | Anderson | B01D 29/606 210/741 |
| 2003/0094407 A1 * | 5/2003 | de Ridder | E03F 5/125 210/120 |
| 2004/0149647 A1 * | 8/2004 | Hampton | B01D 29/925 210/497.01 |
| 2006/0124527 A1 * | 6/2006 | Goodwin | B01D 29/52 210/266 |
| 2006/0151366 A1 * | 7/2006 | Hoang | A01K 63/045 210/95 |
| 2008/0099408 A1 * | 5/2008 | Swindell | B01D 29/62 210/777 |
| 2010/0300991 A1 * | 12/2010 | Hampton | B01D 29/66 210/806 |
| 2011/0253609 A1 * | 10/2011 | Wagner | C02F 1/4674 210/150 |
| 2014/0001128 A1 * | 1/2014 | Mullis | B01D 35/02 210/793 |
| 2015/0048036 A1 * | 2/2015 | Chick | E04H 4/1245 210/791 |
| 2015/0174515 A1 * | 6/2015 | Swindell | B01D 29/52 210/777 |
| 2016/0256801 A1 * | 9/2016 | Hampton | B01D 29/23 |
| 2017/0028328 A1 * | 2/2017 | Parra | B01D 29/21 |
| 2017/0209339 A1 * | 7/2017 | Potucek | F04D 15/0077 |
| 2018/0345181 A1 * | 12/2018 | Hampton | B01D 29/23 |
| 2020/0047090 A1 * | 2/2020 | Hampton | B01D 46/521 |
| 2020/0061502 A1 * | 2/2020 | Erlich | B01D 29/52 |
| 2021/0236964 A1 * | 8/2021 | Afshar | B01D 29/6438 |

* cited by examiner

POOL FILTER ASSEMBLY

FIELD OF THE INVENTION

The present invention relates generally to water filtration, and more particularly to water filtration systems and methods for swimming pools, spas and hot tubs.

BACKGROUND OF THE INVENTION

Water filtration is an important component of swimming pools, spas and hot tubs. The need for the removal of bacteria and other contaminants is critical to the safety and enjoyment of users. Ease of maintenance is also a concern for residential and commercial operators. There is an ongoing need for advancement in water filtration systems for pools, spas, and hot tubs.

SUMMARY OF THE INVENTION

A pool filter system includes a filter housing having top, side and bottom portions defining an enclosed open interior, a water inlet and a water outlet. A pleated filter container in the enclosed open interior of the filter housing includes a pleated filter side wall and divides the open interior of the filter housing into an pleated filter compartment and a particulate filter compartment surrounding the pleated filter side wall. The pleated filter side wall includes a plurality of pleated filter container openings. A particulate filter medium is provided within the particulate filter compartment. A pleated filter is provided within the pleated filter compartment. The water inlet is in fluid communication with the particulate filter compartment, and the water outlet is in fluid communication with the pleated filter compartment. The pleated filter container openings in the pleated filter container side wall have a dimension that is less than the diameter of the particulate filter medium.

The pleated filter container side wall can be tubular. The side portion of the filter housing and the pleated filter container side wall can also be tubular. The filter housing top can be detachable from the filter housing side portion. The pool filter system can further include a pleated filter container top for enclosing the pleated filter container. The pleated filter container top can include a water outlet for communicating with the water outlet of the filter housing. The pleated filter container top can be connected to the filter housing top, wherein placement of the filter housing top on the filter housing side portion encloses the open interior of the filter housing, and positions the pleated filter container top over the pleated filter wall to enclose the pleated filter container.

The pool filter system can include a plurality of pleated filter compartments that are provided within the open interior of the filter housing. Each pleated filter compartment can include a pleated filter container top with a water outlet communicating with a water exhaust manifold. The water exhaust manifold communicates with the water outlet of the filter housing. The sides of each pleated filter compartment can be completely surrounded by portions of the particulate filter compartment. The pleated filter container top can be connected to the filter housing top, wherein placement of the filter housing top on the filter housing sides will position the pleated filter top to enclose the pleated filter container.

The pool filter assembly can further include a backwash assembly. The backwash assembly can include a water supply conduit with a first branch communicating with the inlet conduit and comprising a water outlet, and a second branch communicating with the outlet conduit and comprising a water outlet. At least one valve assembly can be provided in the first branch and at least one valve assembly can be provided in the second branch. Each valve assembly can have a filtration mode and a backwash mode of operation.

The at least one valve assembly in the first branch in the filtration mode of operation can selectively permit water to enter the inlet conduit and prevent water from passing through the water outlet of the first branch, and in the backwash mode of operation selectively prevent water from entering the inlet conduit and permit water to exit the inlet conduit and pass through the water outlet of the first branch. The at least one valve assembly in the second branch in the filtration mode of operation can selectively prevent water from entering the outlet conduit and permit water to exit the outlet conduit and pass through the water outlet of the second branch, and in the backwash mode permit water to enter the outlet conduit and prevent water from passing through the water outlet of the second branch.

The at least one valve assembly in the first branch can include a valve upstream of the water inlet and a valve downstream of the water inlet. The at least one valve assembly in the second branch can include a valve upstream of the water outlet and a valve downstream of the water outlet. A processor can be provided for controlling the operation of the first valve assembly and the second valve assembly. The pool filter assembly can include a water pump in fluid communication with the water supply conduit, where the pool pump is controllable by the processor. The processor can be controllable by a mobile communications device such as a cell phone.

A pool filter assembly for a pleated filter and a particulate filter medium includes a filter housing having top, side and bottom portions defining an enclosed open interior, a water inlet and a water outlet. An internal pleated filter container has a pleated filter container side wall dividing the open interior of the filter housing into a pleated filter compartment and a particulate filter compartment surrounding the pleated filter compartment. The filter side wall includes a plurality of pleated filter container openings. The water inlet is in fluid communication with the particulate filter compartment, and the water outlet is in fluid communication with the pleated filter compartment. The pleated filter container openings in the pleated filter container side wall have a dimension that is less than the diameter of the particulate filter medium.

A method of filtering pool water includes the step of providing a housing having top, side and bottom portions defining an enclosed open interior, a water inlet and a water outlet. An internal pleated filter container is provided having a filter wall dividing the open interior of the housing into a pleated filter compartment and a particulate filter compartment surrounding the pleated filter compartment. The pleated filter container side wall includes a plurality of pleated filter container openings. A particulate filter medium is positioned within the particulate filter compartment. A pleated filter is positioned within pleated filter compartment. The water inlet is in fluid communication with the particulate filter compartment, and the water outlet is in fluid communication with the pleated filter compartment. The pleated filter container openings in the pleated filter container side wall have a dimension that is less than the diameter of the particulate filter medium. Water is flowed through the water inlet, the particulate filter medium, through the pleated filter container openings and into the pleated filter container, the pleated filter, and through the water outlet to filter the water of coarse and fine contaminants.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
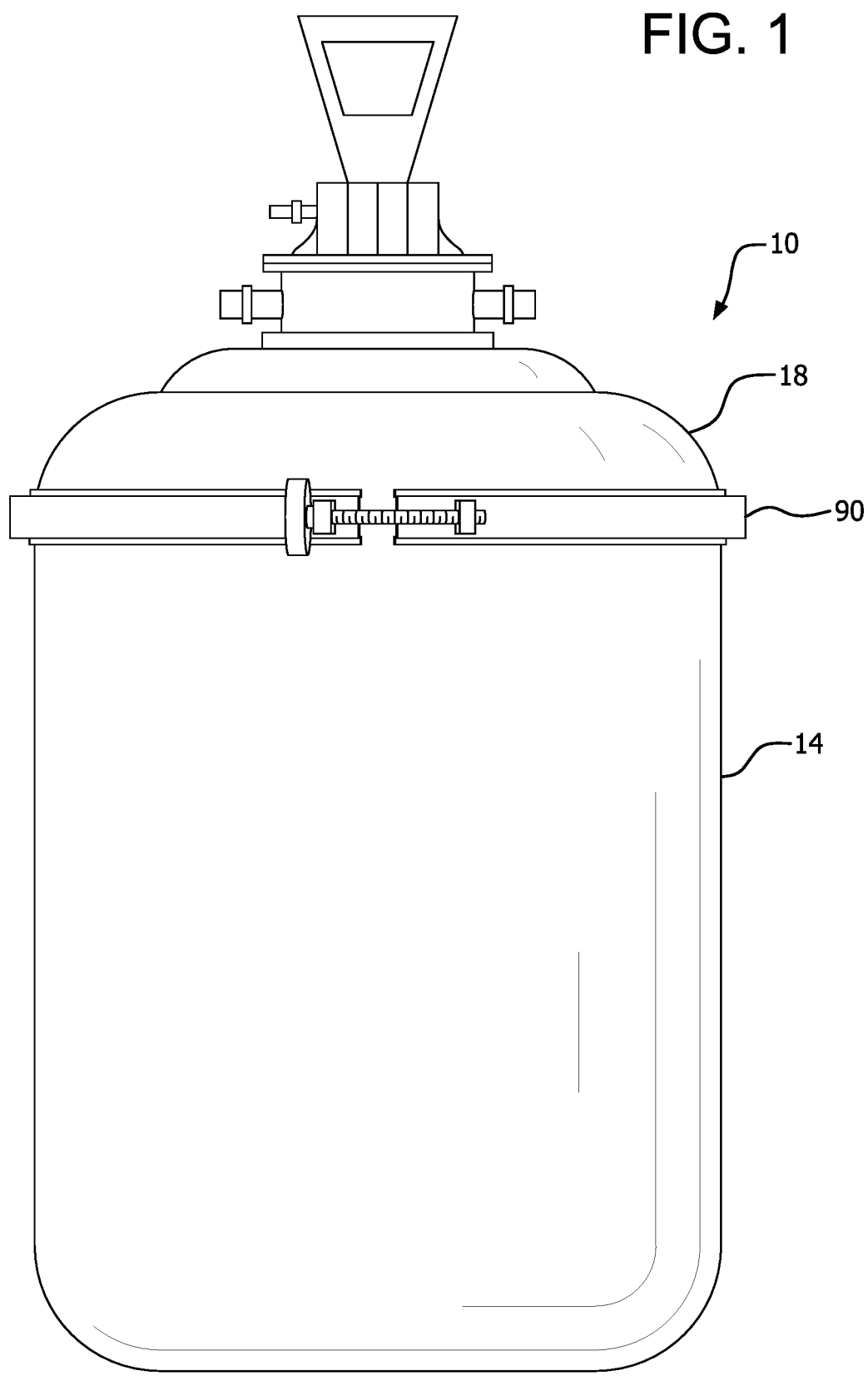
FIG. 1 is a side elevation of a pool filter according to the invention.
Figure 2:
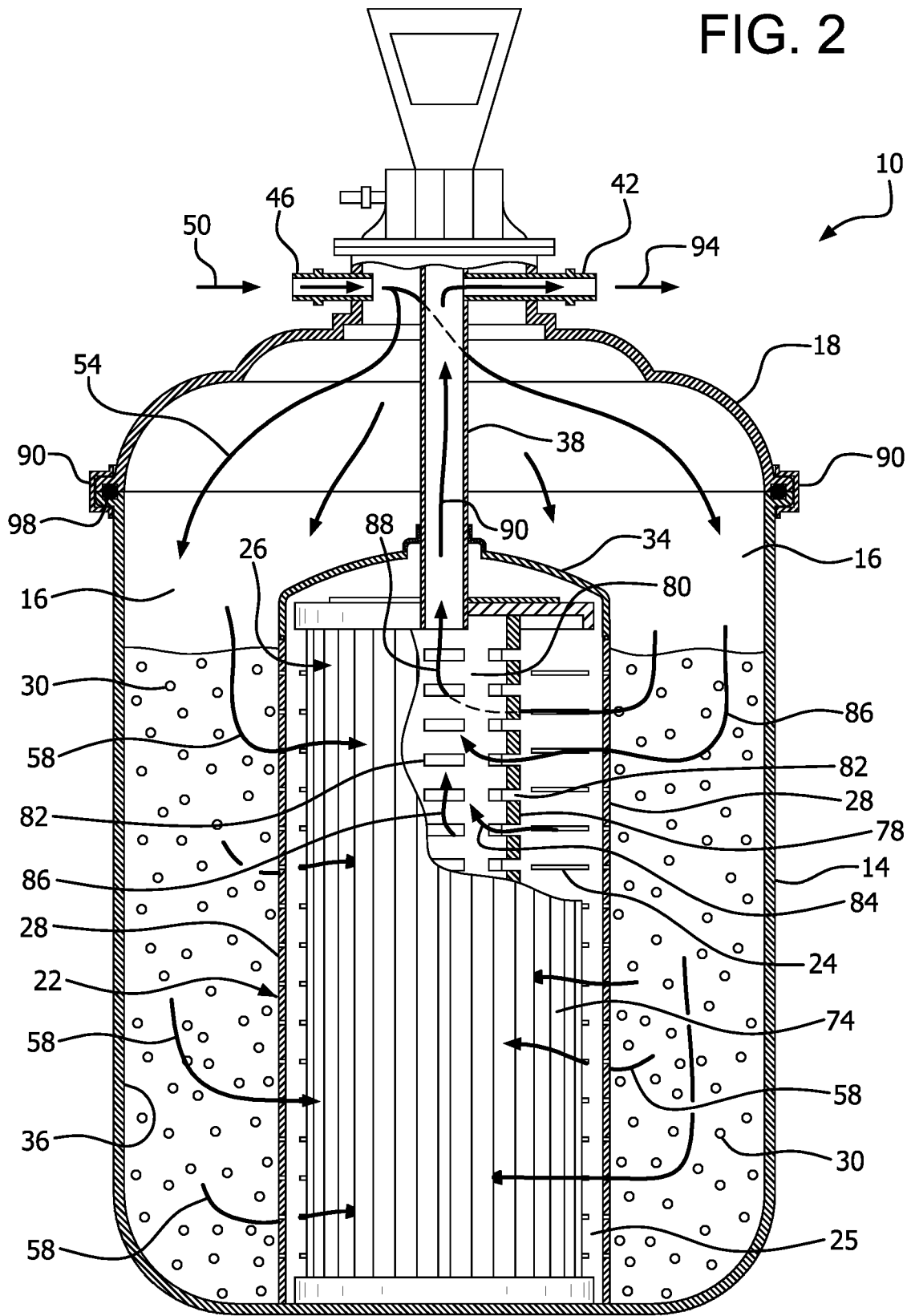
FIG. 2 is a cross-section.

A pool filter system can include a filter housing having top, side and bottom portions defining an enclosed open interior. The filter housing can have a water inlet for receiving pool, spa or hot tub water, and a water outlet for returning water to the pool.

A pleated filter container is provided in the enclosed open interior of the filter housing. The pleated filter container can have a pleated filter side wall that divides the open interior of the filter housing into an open pleated filter compartment and an open particulate filter compartment surrounding the pleated filter container side wall. The pleated filter container side wall includes a plurality of pleated filter container openings.

A particulate filter medium can be provided within the particulate filter compartment. A pleated filter can be provided within the open interior of the pleated filter compartment. The water inlet is in fluid communication with the particulate filter compartment, and the water outlet is in fluid communication with the pleated filter compartment.

The pleated filter container and pleated filter container side wall can vary. The pleated filter side wall can be dimensioned for the particular pleated filter that will be used, which can vary depending upon the water purification specifications for the pool or spa with which the pool filter system will be used. Common pleated filters are generally cylindrical in overall geometry, in which case the pleated filter container can have a tubular side wall and can be dimensioned to receive the pleated filter. The pleated filter container can have varying dimensions and geometries where other pleated filter designs are utilized. Larger pool water volumes or pools or spas with heavy use such as commercial or public pools require more filtration. The filter housing, particulate filter compartment, and pleated filter compartment dimensions and shape can vary according to the requirements of the installation. Each pleated filter container can be completely surrounded on the side walls by portions of the particulate filter compartment to insure that the water entering the pleated filter container has thoroughly contacted the particulate filter material. The contaminant load on the particulate filter material will be more evenly distributed to particulate filter material positioned around the pleated filter containers. This will help to avoid clogging of the particulate filter material.

The pleated filter container openings in the pleated filter container side wall have a dimension that is less than the diameter of the particulate filter medium, so as to prevent the particulate filter medium from entering the pleated filter compartment. The pleated filter container openings can be elongated slits with a length much larger than the width, so long as the width is small enough to prevent the passage of the particulate filter medium. The pleated filter container can comprise a mesh, for example, rather than slits, and the mesh can have a plurality of mesh filter openings that are smaller than the diameter of the particulate filter material, which serve as the pleated filter container openings. The pleated filter container openings can be a plurality of openings distributed completely around the pleated filter container side wall. The pleated filter container openings can be holes, geometrical shapes, elongated slits, or other shapes. The number and location of the pleated filter container openings can vary. The pleated filter container openings can be distributed around all sides of the pleated filter container and vertically along the height of the container, so as to provide adequate water flow from particulate filter medium into the pleated filter container. The pleated filter container side wall can be permanently fixed within the housing or can be removable from the housing to facilitate cleaning and servicing.

The pleated filter container opening or slit width is less than the diameter of the particulate filter media, so as to prevent intrusion of the particulate filter media into the pleated filter container. The slit width or other pleated filter container opening width can for example be 0.020, 0.030, 0.040, 0.050, 0.060, 0.70, 0.080, 0.090, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, and 0.75 inches, or within a range of any high value and low value selected from these values. The length of the slits can vary. Other pleated filter container opening dimensions are possible. The pleated filter container openings should be distributed around the pleated filter container side wall such that there is even water flow into the pleated filter. The volumetric flow through the particulate filter media, through the pleated filter container openings, and through the pleated filter should be sufficient that there are no obstructions to the flow of water at the design water flow rate. The pleated filter container can have different diameter pleated filter container opening widths. Examples of suitable diameters and slit widths include a 10-12" diameter pleated filter container with 0.020-0.500"

slit width, and a 14-16" diameter pleated filter container with 0.020-0.500" slit width. Other dimensions are possible.

The area of the pleated filter container openings relative to the surface area of the pleated filter container side wall can vary. The pleated filter container openings can have a cumulative surface area of 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% of the surface area of the side wall of the pleated filter container, and can be within a range of any high value and low value selected from these values. The surface area of the pleated filter container openings should be selected to permit the volumetric flow of water through the filter assembly necessary for the pool size and water throughput (gallons/hr, liters/hr) necessary for proper maintenance of the pool.

A plurality of the pleated filter container openings such as slits are preferably dispersed around the pleated filter container and across the height of the pleated filter container so as to receive water that has been filtered by the particulate filter media. The precise number and location of the slits can vary depending on the characteristics of the water filtration assembly such as desired water throughput. The length of the slits can also vary depending on desired flow characteristics. The slits can be oriented vertically, horizontally, or off vertical. The slit orientation can vary with some vertical, some horizontal, and/or some off axis.

The pleated filter can be any suitable pleated filter. Pleated filters are comprised of filter sheet material folded or arranged into sheets or pleats assembled next to one another to increase filter surface area within a given volume of space. Such pleats can be secured to a central core or tube of non-filter material such as plastic with a number of openings, to support the pleats and permit the flow of water exiting the pleats to a pleated filter outlet, Examples of suitable particulate filter media include pleated cellulose cartridge Spiro Pure (Spirotech BV; Helmond, Netherlands); resin cellulose pleated resin bonded cartridge (Parker Hannifin; Cleveland Ohio); durable polyester reinforced core (Harmsco; Riviera Beach, Fla.); Tri-X filter for HotSpring® spa (Masco Corporation, Livonia Mich.); Sta-Rite-57M120 filter cartridges inner and outer PL0163 (Pentair; Minneapolis Minn.); Pure Line Cartridge Hayward C1005 PL0165 (Pure Line Filters; Brooklyn N.Y.); Unicel Cartridge C1200 (Unicel; Chatsworth Calif.); FC-0690 (Filbur Manufacturing; Lake Oswego, Oreg.); and 4 oz Layered Melt Blown Spunbond Poly Filters (Pleatco LLC; Louisville, Ky.). Other pleated filters can be used with the invention such as from Global Filters (Cedar Rapids, Iowa); Shelco Filters (Middletown, Conn.); Kraissl Company Inc. (Hackensack, N.J.); Jaxon Filtration Inc. (Franklin, Ga.); Schroeder Industries Inc. (Leetsdale, Pa.); Omni Pure Filter Company (Caldwell, Id.); Pleatco Pure (Glen Cove, N.Y.); and Delta Pure (West Chicago, Ill.). Other pleated filters are possible.

The particulate filter medium can be any suitable particulate filter medium. Suitable particulate filter materials include diatomaceous earth, activated carbon, sand and glass. The particulate filter media can have a size of 1/16", 1/8", 3/16", 1/4", 5/16", 3/8", 7/16", 1/2", 9/16", 5/8", 11/16", and 3/4", and can be within a range of any high value and low value selected from these values. Other particulate filter media materials and sizes is possible. Specific examples include U.S. Silica Gravel (US Silica; Katy, Tex.); Green Sand (US Silica; Katy, Tex.); Aqua Quartz Grade A Silica Sand (US Silica; Katy, Tex.); Sand (Quickcrete Company, Atlanta Ga.); sand (H₊H Materials, Inc., Stoneboro, Pa.); Clorox sand (The Clorox Company, Oakland, Calif.); Zeobright Zelite & Xtreme (Zeotech Corporation; Fort Worth, Tex.); Zeo Sand Blue Sand Assist (Zeotech Corporation; Fort Worth, Tex.); and Caribbean (Zeotech Corporation; Fort Worth, Tex.). The particulate filter medium can also include, for example, Vitroclean 100% Recycled Glass (Trivitro; Seattle, Wash.); Vitroclean Aquatie (Trivitro; Seattle, Wash.); Vitroclean Green (Trivitro; Seattle, Wash.); Vitroclean Pebble (Trivitro; Seattle, Wash.); and Pod Gravel. The particulate filter media can have varying sizes.

The filter housing top can be detachable from the filter housing side portion. The pleated filter container can have a top that is detachable form the pleated filter container side wall. A water exhaust outlet or conduit can be provided in the pleated filter container top to exhaust water from the pleated filter container to the water outlet of the filter housing. The pleated filter container top can be connected to the filter housing top, such that removal of the filter housing top also removes the pleated filter top. Placement of the filter housing top on the filter housing side portion encloses the open interior of the filter housing, and positions the pleated filter container top over the pleated filter wall to also enclose the pleated filter container.

A plurality of pleated filter compartments can be provided within the open interior of the filter housing. Each pleated filter compartment can include a pleated filter container top with a water outlet communicating with a water exhaust manifold, the water exhaust manifold communicating with the water outlet of the filter housing. The sides of each pleated filter compartment can be completely surrounded by portions of the particulate filter compartment. Any number of pleated filters and pleated filter containers can be provided within a single housing.

A pool filter assembly for a pleated filter and a particulate filter medium can include a filter housing having top, side and bottom portions defining an enclosed open interior. The filter housing can have a water inlet for connecting to pool water supply, and a water outlet for connecting to the pool water return. A pleated filter container is provided in the enclosed open interior of the filter housing. The pleated filter container can have a pleated filter side wall that divides the open interior of the filter housing into an open pleated filter compartment and an open particulate filter compartment surrounding the pleated filter container side wall, with pleated filter container openings to permit the passage of water. The water inlet is in fluid communication with the particulate filter compartment, and the water outlet is in fluid communication with the pleated filter compartment. The pleated filter container openings in the pleated filter container side wall have a dimension that is less than the average diameter of the particulate filter medium.

A method of filtering pool water according to the invention includes the step of providing a filter housing having top, side and bottom portions defining an enclosed open interior. The filter housing can have a water inlet for connecting to pool water supply, and a water outlet for connecting to the pool water return. A pleated filter container is provided in the enclosed open interior of the filter housing. The pleated filter container can have a pleated filter side wall that divides the open interior of the filter housing into an open pleated filter compartment and an open particulate filter compartment surrounding the pleated filter container side wall and has a plurality of pleated filter container openings to permit the passage of water. The water inlet is in fluid communication with the particulate filter compartment, and the water outlet is in fluid communication with the pleated filter compartment. The pleated filter container openings in the pleated filter container side wall have a dimension that is less than the diameter of the particulate filter medium.

A particulate filter medium is positioned within the particulate filter compartment. A pleated filter is positioned within the pleated filter compartment. The water inlet is in fluid communication with the particulate filter compartment, and the water outlet is in fluid communication with the pleated filter compartment, and wherein the pleated filter container openings in the pleated filter container side wall have a dimension that is less than the diameter of the particulate filter medium.

Pool water is flowed from the pool, for example through a drain, skimmer, overflow catchment, or pool cleaning device through the water inlet. The water flows through the particulate filter medium, through the pleated filter container openings and into the pleated filter container. The water is further filtered by the pleated filter, and flows from the pleated filter container through the water outlet of the filter housing and can be returned to the pool, spa or hot tub. The pool filter assembly will filter the water of coarse and fine contaminants.

A water filtration system 10 according to the invention is shown in FIGS. 1-4. The system 10 includes a housing 14 with an open interior 16 and has an open end 17. A lid 18 is provided for closing the open end 17 of the housing 14. A pleated filter container 22 is provided within the housing 14 and has side wall 28 and an open interior 25 for receiving a pleated filter 26. The pleated filter container 22 has a plurality of pleated filter container openings 24. The pleated filter container 22 can be closed by a suitable lid or closure 34.

A particulate filter medium 30 is provided in the interior space 16 of the housing 14 between the inside walls 36 of the housing 14 and the walls 28 of the pleated filter container 22. A water exhaust conduit 38 extends from within the pleated filter container 22 to a water outlet 42 that can be in the lid 18 or the housing 14. Water enters the housing 14 through a water inlet 46 that can be provided in the lid 18 or the housing 14.

In operation, water enters the filter system 10 through the water inlet 46 as shown by arrow 50 which receives water from the swimming pool, spa or hot tub. The water then passes through the open interior 16 of the housing 14 as shown by arrow 54 and enters the particulate filter material 30. The water traverses the particulate filter material 30 where large diameter contaminants such as debris and leaves and viscous contaminants such as body oils and skin lotions are removed. The water passes through the particulate filter material 30 and then traverses the pleated filter container openings 24 to enter the open interior 25 of the pleated filter container 22. The water then strikes the pleats 74 of the pleated filter 26 as shown by arrow 58. Smaller diameter contaminants such as silt will be removed by the pleats 74 of the pleated filter 26. The pleated filter 26 can have a cylindrical support 78 for supporting the pleats 74. The cylindrical support 78 has an open interior 80. The cylindrical support 78 has an openings 82 in the pleated filter support 78 that allow water to traverse into the open interior 80 as shown by arrows 84 and flow through the open interior 80 as shown by arrows 86. Water will then flow out of the open interior 80 as shown by arrows 88 to the water exhaust conduit 38 as shown by arrows 90. Water will leave the housing 14 through the water outlet 42 as shown by arrow 94 and can return to the swimming pool, spa or hot tub.

Figure 3:
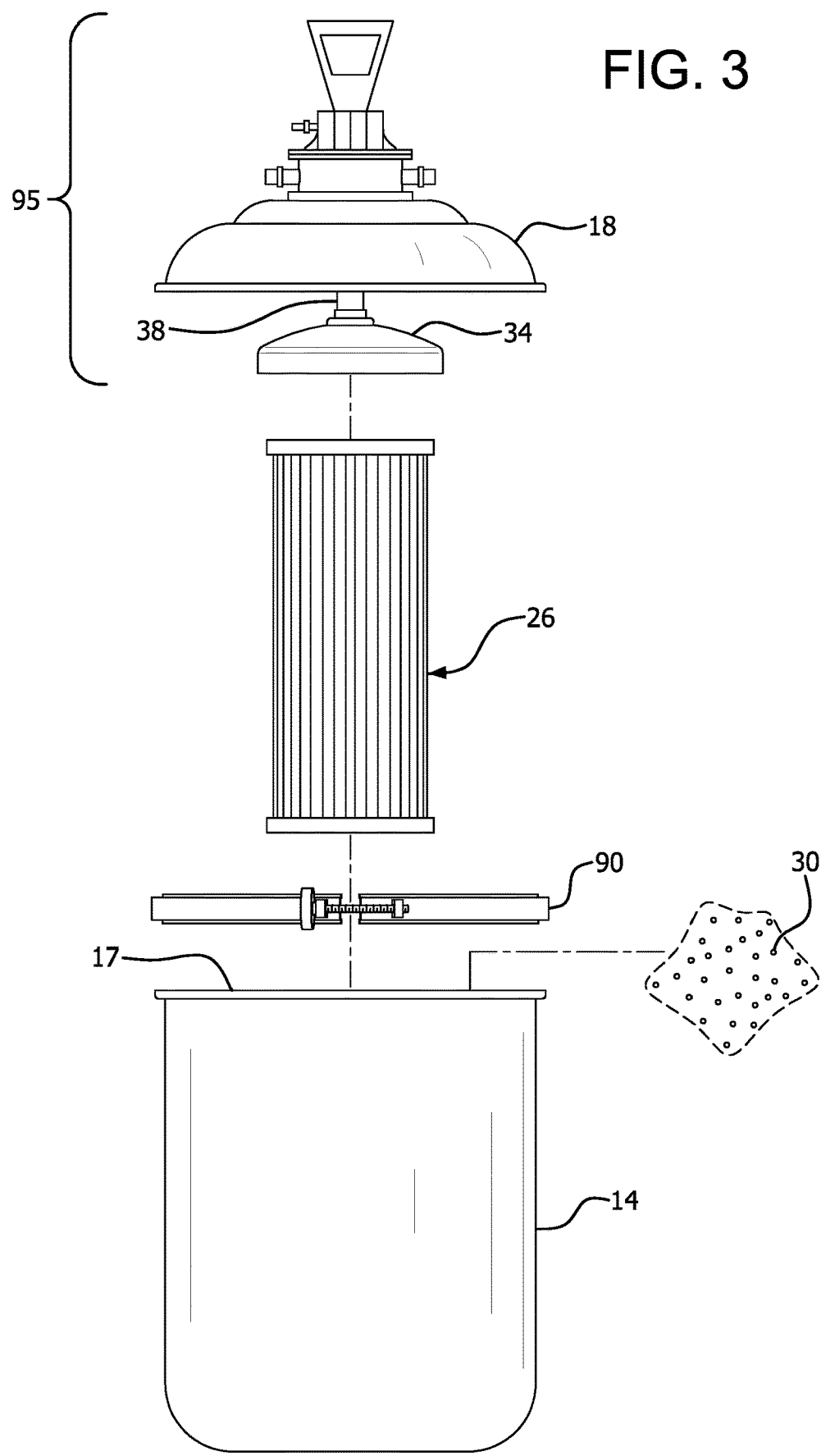
FIG. 3 is an exploded side elevation.
Figure 4:
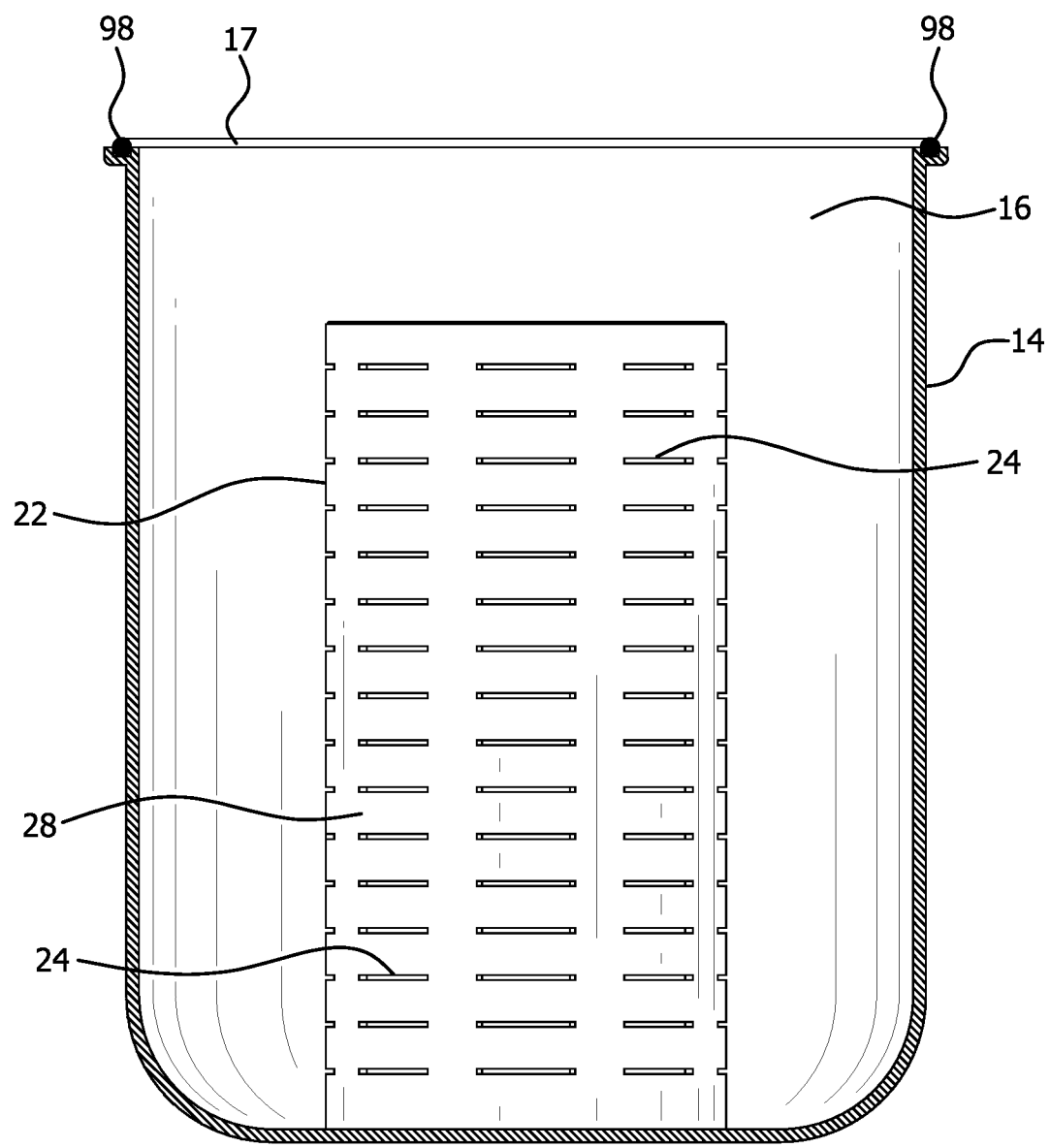
FIG. 4 is a side elevation of a pleated filter container, within a housing in cross-section.

The lid 34 for the pleated filter container 22, water exhaust conduit 38 and lid 18 for the housing 14 can be provided in a single integrated assembly 95 (FIG. 3). Placement of the assembly 95 onto the housing 14 will cause the lid 18 to mate with and enclose the open end 17 of the housing 14. The lid 34 will also be positioned over the pleated filter container 22, and a bracket 90 or other suitable structure can be positioned and tightened to secure both the lid 18 and the lid 34 in position with the water exhaust conduit 38 positioned to receive water from the open interior 80 of the pleated filter 26. The sealing bracket 90 or other suitable structure can be provided to secure the lid 18 to the housing 14. An O-ring seal 98 can be provided between the lid 18 and housing 14 to provide a watertight seal.

Figure 5:
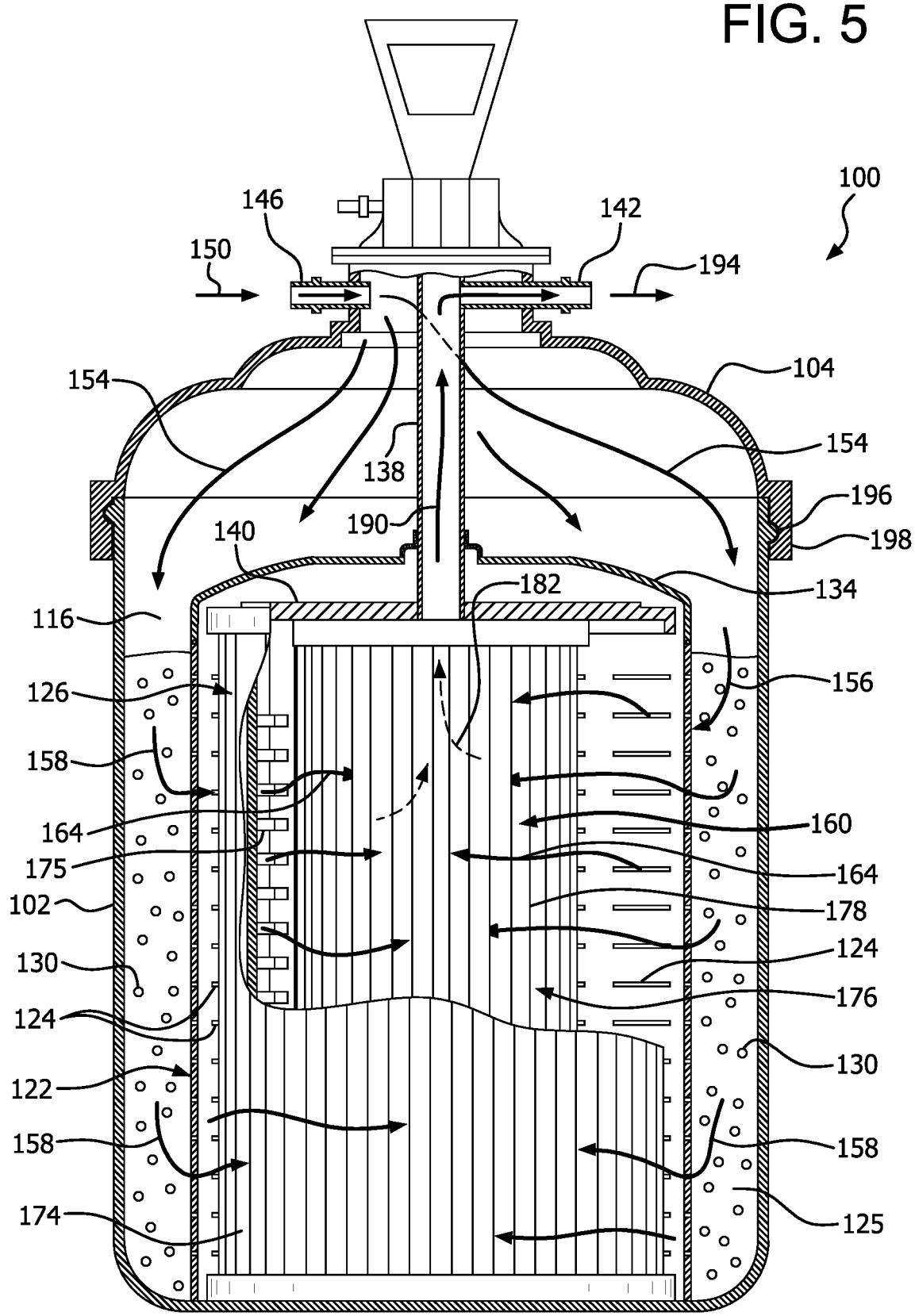
FIG. 5 is a schematic diagram of an embodiment with multiple pleated filters within a pleated filter container and within a single housing.
Figure 6:
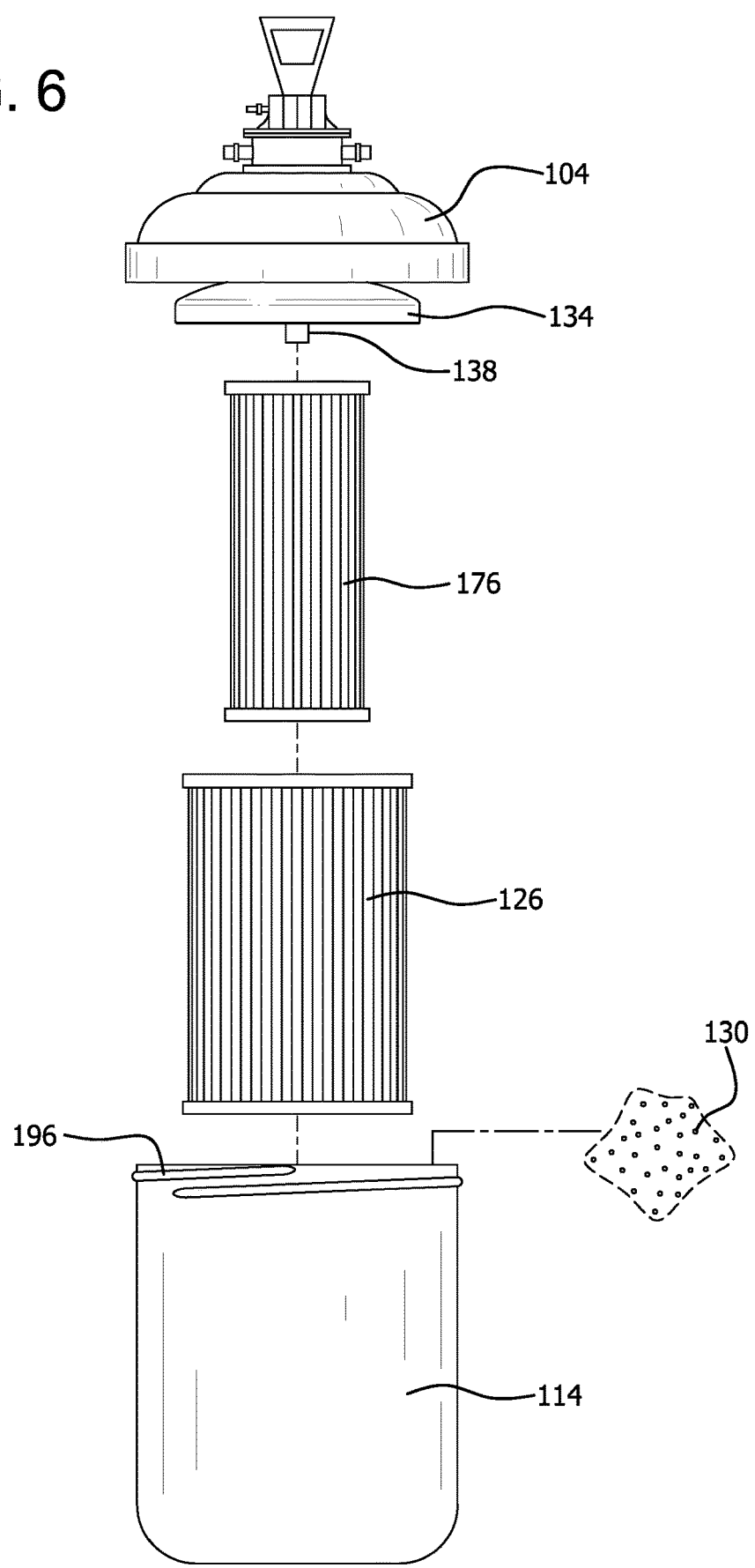
FIG. 6 is an exploded side elevation.
Figure 7:
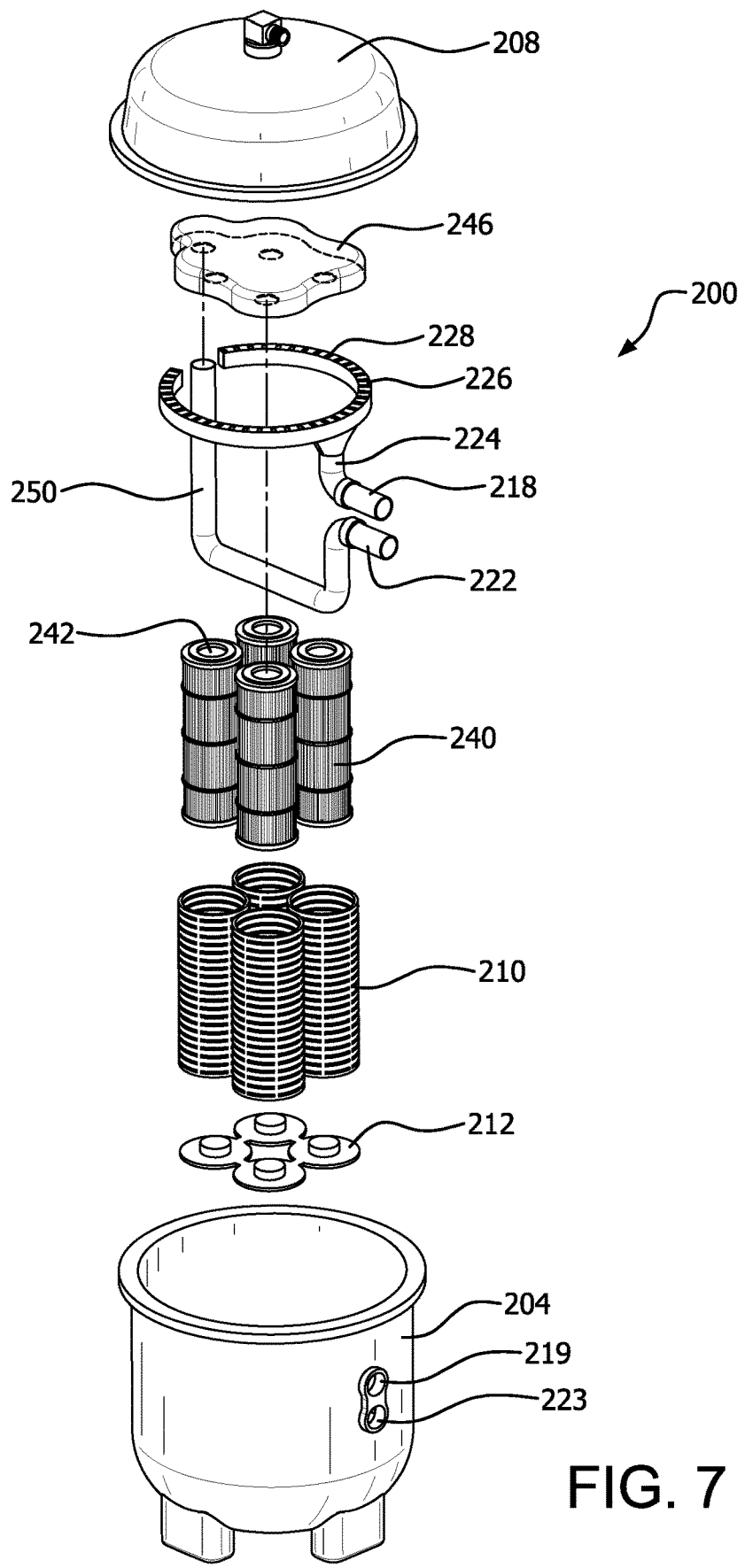
FIG. 7 is an exploded perspective view of an embodiment with multiple pleated filters and multiple pleated filter containers within a housing.

Double pleated filters, in which a pleated filter having a smaller diameter is fitted within the open interior of another pleated filter having a larger diameter, are currently used in some applications where the double pleats provide a second stage of filtration. Such double pleated filters can be used with the invention. There is shown in FIGS. 5-6 an alternative embodiment using a double pleated filter embodiment. The filter assembly 100 can have a housing 102 and a lid 104 as previously described. A pleated filter container 122 is provided within an open interior 116 of the housing 102. Pleated filter container openings 124 in the pleated filter container 122 allow for the passage of water but not particulate filter material 130 that is positioned in the annular interior space 125 between the housing 102 and the pleated filter container 122. A lid 134 closes the pleated filter container 122. A bracket 140 is provided to hold the filters in place. A water exhaust 138 is provided to direct water through a water outlet 142. Water enters through a water inlet 146. Threads 196 or other suitable structure on the housing 102 can be provided to secure the lid 104 to cooperating threads 198 or other structure of the housing 102.

Water enters through the water inlet 146 as shown by arrow 150. Water then flows as shown by arrows 154 to the particulate filter material 130 and through the particulate filter material 130 as shown by arrow 156. The particulate filter material 130 filters the water, which then passes through the pleated filter container openings 124 into the pleated filter container 122. The water within the pleated filter container 122 contacts pleats 174 of a larger diameter pleated filter 126 as shown by arrows 158. Water passes through openings 175 in the interior of the larger diameter pleated filter 126 as shown by arrows 164 to contact the pleats 178 of the smaller diameter pleated filter 176. Water passing through the smaller diameter filter 176 as shown by arrows 182 then reaches the water exhaust 138 as shown by arrows 190. Water exits the water outlet 142 is shown by arrows 194.

Large commercial pools and spas require an elevated amount of filtering. The invention can be adapted for such uses. There is shown in FIGS. 7-10 a water filter assembly 200. The water filter assembly 200 includes a housing 204 and a suitable enclosure such as lid 208. Within the housing 204 are pleated filter containers 210 which can rest on a suitable support 212. Water is supplied to the housing 204 to a suitable inlet conduit 218 which can be provided in a port 219. Water is exhausted from the housing 204 through an outlet conduit 222 which can be provided in a port 223.

Figure 8:
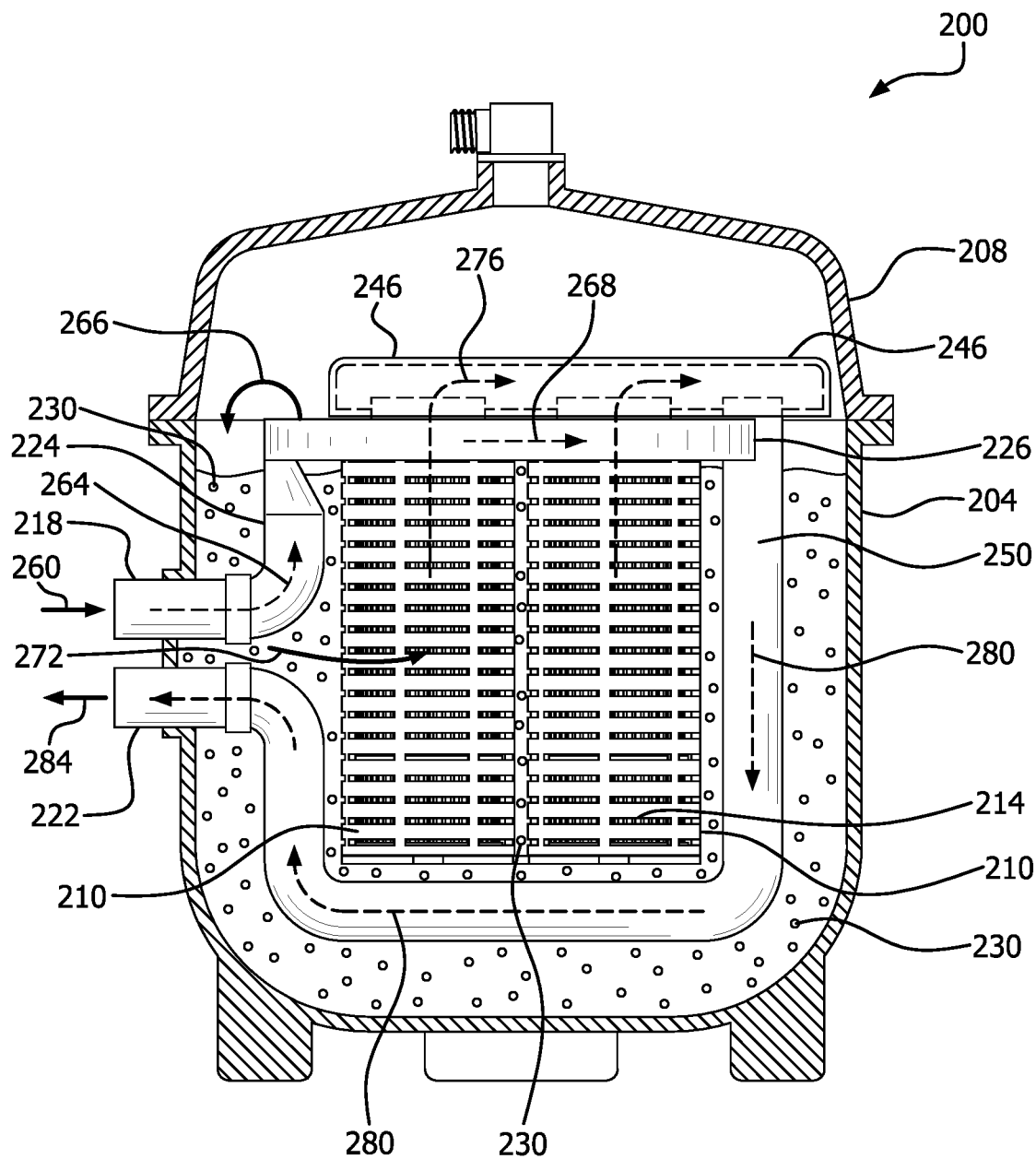
FIG. 8 is a cross sectional view.

The pleated filter containers 210 include pleated filter container openings 214 to permit the passage of water but retain particulate filter media 230 outside the pleated filter containers 210. The particulate filter media 230 surrounds the pleated filter containers 210 and the space between the housing 204 and the pleated filter containers 210 (FIG. 8). The water inlet conduit 218 communicates with a conduit 224 and distribution manifold 226 with a plurality of openings 228 to distribute the water's around the circumference of the particulate filter media 230.

Pleated filters 240 with interior openings 242 are provided in the pleated filter containers 210. Four pleated filters 240 are shown, however, more or fewer are possible with the addition of a similar number of pleated filter containers 210 and appropriately sized housing 204. Water leaving the open interior 242 of the pleated filters 240 enters an exhaust manifold 246. The exhaust manifold 250 communicates with an exhaust conduit 248 and the outlet conduit 222.

As shown particularly in FIG. 8, water enters the outlet 218 as shown by arrow 260, and traverses the conduit 224 as shown by arrow 264. Water then enters the distribution manifold 226 and is distributed from the openings 228 as shown by arrow 266 to contact the particulate filter media 230. The openings 228 can be of varying number, dimension, and location in the distribution manifold 226. Water will be directed through the distribution manifold 226 as indicated by arrow 268 such that the water will be distributed throughout the housing 200 for and the surface of the particulate filter media 230. Other designs for the distribution manifold 226 are possible.

Water will be filtered through the particulate filter media 230 as shown by arrow 272 and will then enter the pleated filter container openings 214 and the pleated filter containers 210 to reach the pleated filters 240. The water will be further filtered by the pleated filters 240 and will exit through the interior openings 242 of the pleated filters 240. Filtered water will be collected by the manifold 246 as indicated by arrow 276 as will pass through the outlet conduit 248 as indicated by arrow 280 and the outlet conduit 222 as indicated by arrow 284, where it can be returned to the pool.

Figure 9:
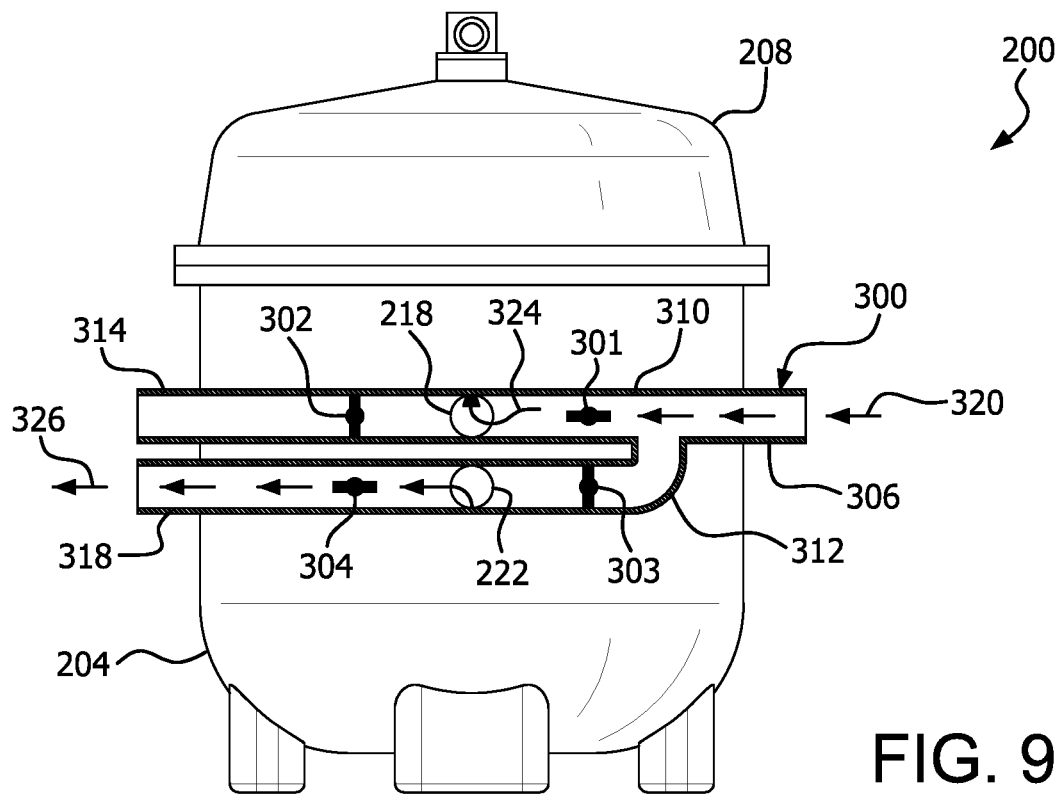
FIG. 9 is a schematic depiction of a backwash system for a water filter assembly according to the invention, in a first mode of operation.
Figure 10:
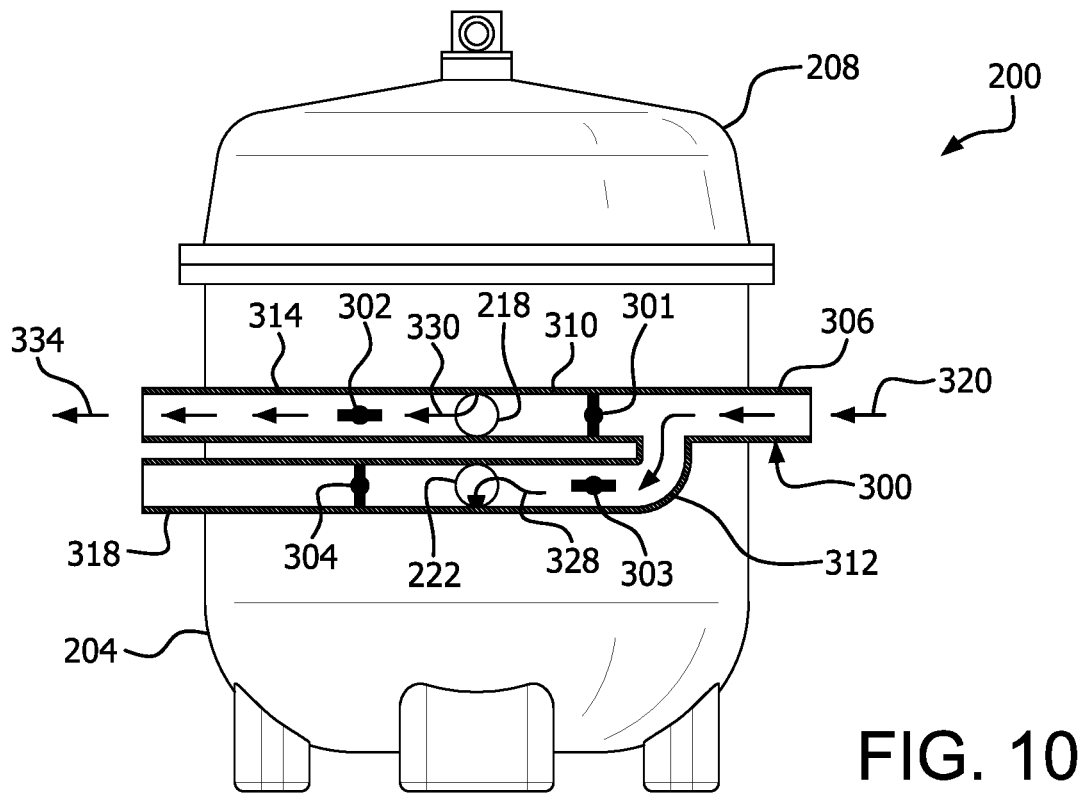
FIG. 10 is a schematic depiction of a backwash system for a water filter assembly according to the invention, in a second mode of operation.

The pool filter assembly 200 can be back flushed, as shown in FIG. 9-10. A backflush valve assembly 300 can be provided and connected to the inlet conduit 218 and the outlet conduit 222. The valve assembly 300 has an inlet 306 which communicates with a first branch 310 communicating with the inlet conduit 218 and a second branch 312 communicating with the water outlet conduit 222. The first branch 310 has a valve 301 upstream of the inlet conduit 218 and a valve 302 downstream from the inlet conduit 218 in a first branch water outlet 314. The second branch 312 has a valve 303 upstream of the outlet conduit 222 and a valve 304 downstream from the outlet conduit 222 and in a second branch water outlet 318.

In a first mode of operation (FIG. 9) during normal operation of the pool filter assembly 200, the valves 301 and 304 are open and the valves 302 and 303 are closed. Water flows into the water supply conduit 306 as shown by arrow 320 past the valve 301 and into the inlet conduit 218 as shown by arrow 324. The water flows through the filter assembly 200 and exits the outlet conduit 222 and flows past the valve 304 through the second branch water outlet 318 as shown by arrow 326 (FIG. 9). Water does not flow through the branch 312 due to the closed valve 303. During the back flushing operation, the valves 301 and 304 are closed and the valves 302 and 303 are opened. Water 320 entering the conduit 306 is directed into the branch 312 and past the open valve 303 into the outlet conduit 222 as shown by arrow 328. Water flow through the filter assembly 200 is thereby reversed and exits through the inlet conduit 218 as shown by arrow 330. Water flows past the open valve 302 in the first branch water outlet 314 and exits as shown by arrows 334. This flow will be backflush and will contain contaminants and can be directed to a drain or suitable post processing. A processor 340 can be provided to control the normal and backflush operations through control of a water pump and actuation of the valves 301-304.

Figure 11:
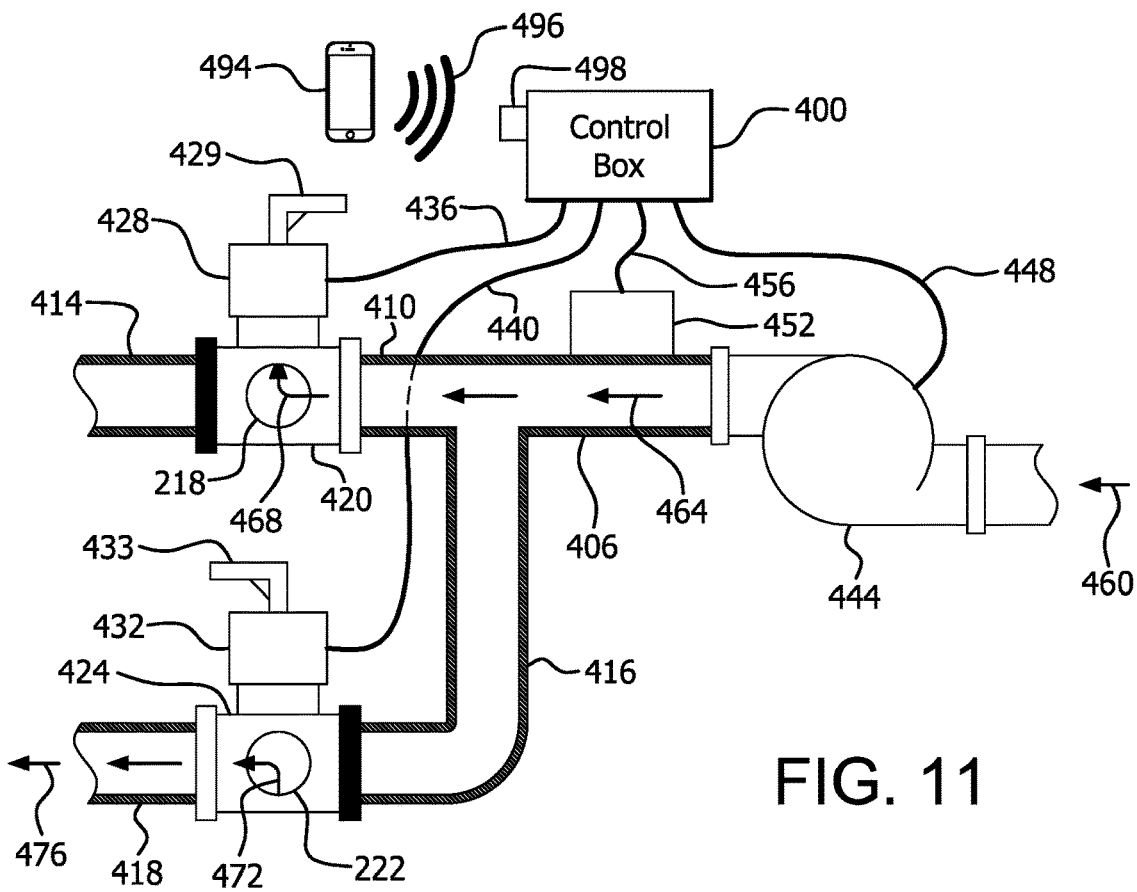
FIG. 11 is a schematic depiction of an alternative embodiment of a backwash system for a water filter assembly according to the invention, in a first mode of operation.
Figure 12:
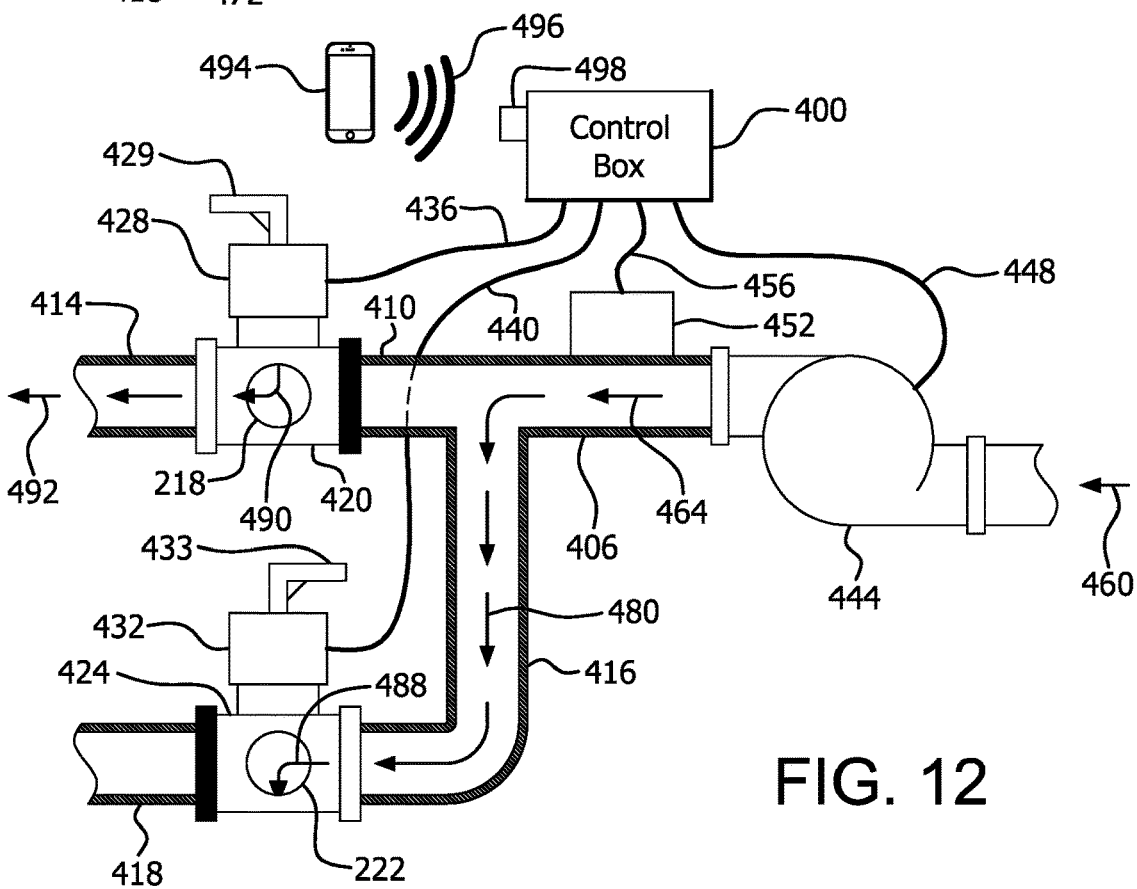
FIG. 12 is a schematic depiction of an alternative embodiment of a backwash system for a water filter assembly according to the invention, in a second mode of operation.

There is shown in FIGS. 11-12 an alternative embodiment of a backwash valve assembly including a processor 400 for controlling the backwash operation, and remote control. The backwash valve assembly communicates with the inlet conduit 218 and the outlet conduit 222 of the water filter assembly as previously described. A water supply conduit 406 includes a first branch 410 communicating with the water inlet conduit 218 and has a water outlet 414. A second branch 416 communicates with the water outlet conduit 222 and has a water outlet 418. A first valve assembly 420 is provided in the first branch 410 and communicates with the water inlet conduit 218 and the water outlet 414. A second valve assembly 424 is provided in the second branch 416 and communicates with the water outlet conduit 222 and the water outlet 418.

The first valve assembly 420 in the first branch 410 in the filtration mode of operation selectively permits water to enter the inlet conduit 218 and prevents water from passing through the water outlet 414 of the first branch 410 (FIG. 11). In the backwash mode of operation (FIG. 12), the first valve assembly 420 selectively prevents water from entering the inlet conduit 218, but permits water to exit the water filtration assembly at the inlet conduit 218 and pass through the water outlet 414 of the first branch 410.

The second valve assembly 424 in the second branch 416 in the filtration mode of operation (FIG. 11) selectively prevents water from entering the outlet conduit 222, and permits water to exit the outlet conduit 222 and pass through the water outlet 418 of the second branch 416. In the backwash mode of operation the second valve assembly 424 permits water to enter the outlet conduit 222, and prevents water from passing through the water outlet 418 of the second branch 416.

A first solenoid 428 or other suitable device for controlling the operation of the first valve assembly 420 is connected by a control line 436 to the processor 400 through a control line 436. A handle 429 for manually operating the first valve assembly can also be provided. A second solenoid 432 or other suitable device for controlling the operation of the second valve assembly 424 is connected to the processor 400 by a control line 440. A handle 433 for manually operating the second valve assembly 424 can also be provided. A pump 444 directs water from the pool or spa into the water supply conduit 406, and operation of the pump 444 can be controlled by the processor 400 through a control line 456. A pressure sensor 452 senses the pressure in the water supply conduit 406 and communicates through a line 456 to the processor 400.

In operation, the pump 444 directs water 460 from the pool or spa into the water supply conduit 406 as shown by arrow 464. In the filtration mode of operation (FIG. 11), the first valve assembly 420 and second valve assembly 424 are configured such that water flows into the water inlet conduit 218 as shown by arrow 468. Water flows out of the water outlet conduit 472 and out of the water outlet 418 of the second branch 416 as shown by arrow 476. The backwash assembly can be switched to the backwash mode of operation when the pressure sensor 452 signals to the processor that the pressure drop through the filter is too great and the filter has contaminants. The processor 400 can stop operation of the pump 444 through the control line 448, and can send signals to the first solenoid 428 and the second solenoid 432 to switch from the filtration mode to the backwash mode of operation. Inlet water 464 passes through the second branch 416 as shown by arrow 480 and enters the water outlet conduit 222 as shown by arrow 488 to perform the backflush. The water exits from the water inlet conduit 218 as shown by arrow 490 and passes through the water outlet 414 of the first branch 410 (FIG. 12). The processor 400 can in similar manner operate to change the backwash valve assembly back to the filtration mode of operation upon the passage of a time programmed into the processor, or upon a pressure signal from the pressure sensor 452 or another suitable pressure sensor.

The control lines 436, 440, 448 and 456 are shown as wired connections but can also be wireless. The backwash valve assembly can also be operated remotely. For example, a cell phone 494 or other signal transmitting device can receive commends from an owner or operator through a suitable software and an interface, or through a suitable cell phone application that has been downloaded to the cell phone. A signal 496 is transmitted by the cell phone through telecommunications networks to a receiver 498 which communicates commands and settings to the processor 400. Alternatively, the processor can receive commands through wifi, bluetooth, or other suitable wireless communications technologies.

The invention as shown in the drawings and described in detail herein disclose arrangements of elements of particular construction and configuration for illustrating embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A pool filtration system, comprising:
a filter housing including:
a lid portion, having a water inlet and a water outlet; and
a lower housing portion having a side wall and a bottom wall, said lid portion and lower housing portion together defining an interior volume;
a filter container defined by a perforated side wall, a closed bottom and a container lid, is disposed within said interior volume, said perforated side wall dividing the interior volume into a pleated filter compartment and a particulate filter compartment surrounding the perforated side wall and said pleated filter compartment, said container lid having an opening placing said pleated filter compartment in fluid communication with said water outlet;
a particulate filter medium disposed within the particulate filter compartment; and
a pleated filter disposed within the pleated filter compartment;
wherein the water inlet is in fluid communication with the particulate filter compartment and the container lid opening is in fluid communication with a filtrate side of said pleated filter, the perforations in the side wall have a dimension that is less than the diameter of the particulate filter medium so that the particulate filter medium will not flow therethrough;
wherein water to be filtered flows into said filter housing interior volume through said inlet, through the particulate filter medium in said particulate filter compartment, through the perforated side wall, through the pleated filter and out of said filter container through said container lid opening and out of the filter housing through said water outlet.

2. The pool filtration system of claim 1, wherein a lowermost portion of said lid portion and an uppermost portion of said lower housing portion each include continuous horizontally extending circumferential rim for interposing receipt of a sealing o-ring, and a circumferential bracket engaging said rims to sealingly connect said lid portion to said lower housing portion.

3. The pool filtration system of claim 1, wherein said lowermost portion of said lid portion and an uppermost portion of said lower housing portion include threads enabling said lid portion and said lower housing portion to be sealingly and threadably connected.

4. The pool filtration system of claim 1, wherein said container lid, a water exhaust conduit and lid portion of said filter housing comprise a single integrated assembly.

5. The pool filtration system of claim 4, wherein placement of said single integrated assembly onto an open end of said lower housing portion will cause the lid to mate with and enclose the open end of said lower housing portion.

6. The pool filtration system of claim 4, wherein placement of said single integrated assembly onto an open end of said lower housing portion will cause said container lid to be positioned over an open end of filter container.

7. The pool filtration system of claim 1, wherein a water exhaust conduit places said water outlet in fluid communication with said container lid opening.

8. The pool filtration system of claim 1, wherein said perforations comprise slits.

9. The pool filtration system of claim 1, wherein said particulate filter medium includes one or more of: diatomaceous earth, activated carbon, sand and glass.

10. The pool filtration system of claim 1, wherein said particulate filter medium includes particles having an approximate diameter of one of more of: $\frac{1}{16}"$, $\frac{1}{8}"$, $\frac{3}{16}"$, $\frac{5}{16}"$, $\frac{3}{8}"$, $\frac{7}{16}"$, $\frac{1}{2}"$, $\frac{9}{16}"$, $\frac{5}{8}"$, $\frac{11}{16}"$, and $\frac{3}{4}"$.

11. The pool filtration system of claim 1, wherein said pleated filter includes a pair of sequential pleated filters.

12. The pool filtration system of claim 11, wherein said pair of sequential pleated filters each have a different pore size diameter.

13. The pool filtration system of claim 12, wherein said pair of sequential pleated filters include a pleated filter having a smaller pore size diameter that is fitted within an open interior of another pleated filter having a larger pore size diameter.

14. The pool filtration system of claim 1, wherein a lowermost portion of said filter container sidewall engages said bottom wall of said lower housing portion to form said closed bottom.

15. The pool filtration system of claim 1, wherein said filter container side wall is tubular.

* * * * *